July 11, 1933.　　　　　J. GINSBERG　　　　　1,917,932

VEHICLE

Filed May 29, 1931　　　　3 Sheets-Sheet 1

INVENTOR
Jacob Ginsberg,
BY
Frederick Breitenfeld
ATTORNEY

July 11, 1933.  J. GINSBERG  1,917,932
VEHICLE
Filed May 29, 1931  3 Sheets-Sheet 2
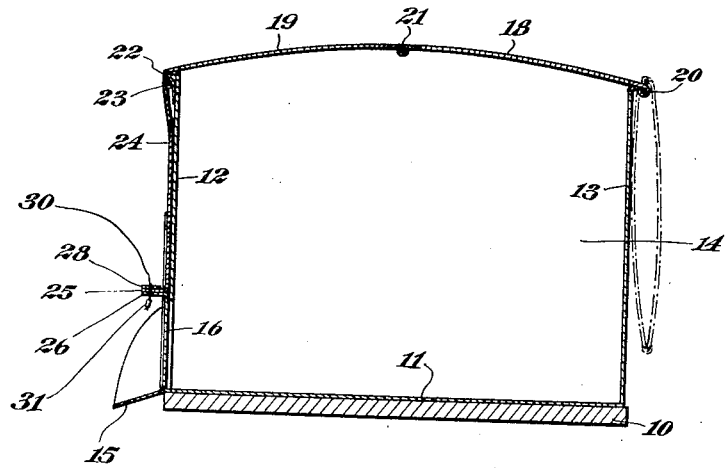
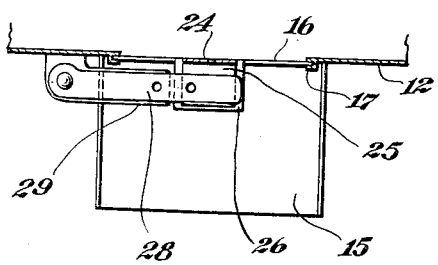
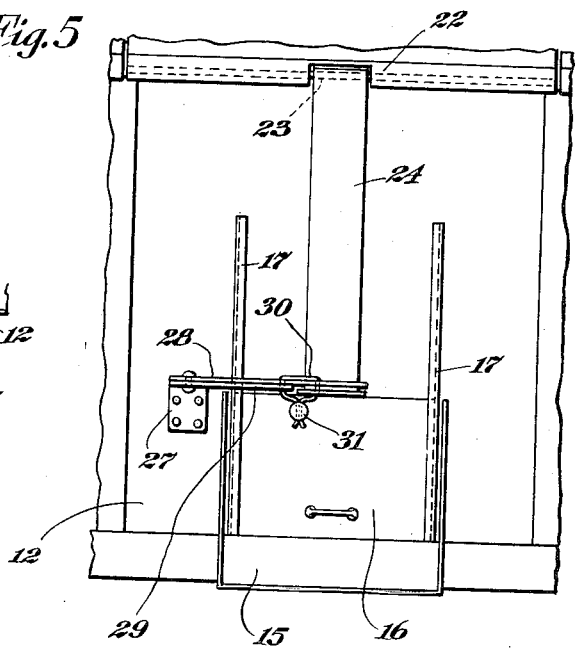
INVENTOR
Jacob Ginsberg,
BY
Frederick Breitenfeld
ATTORNEY

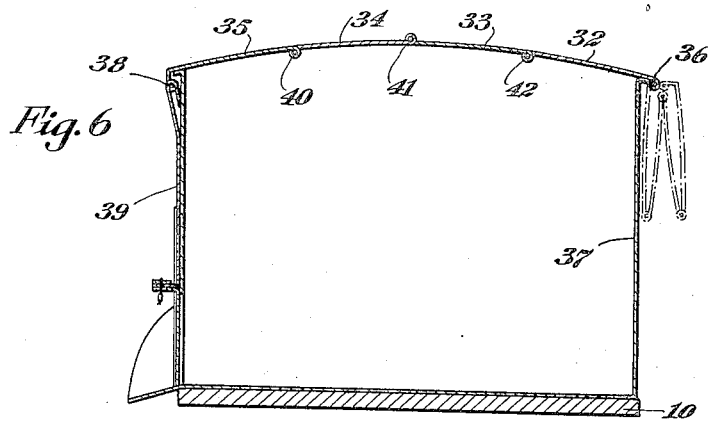
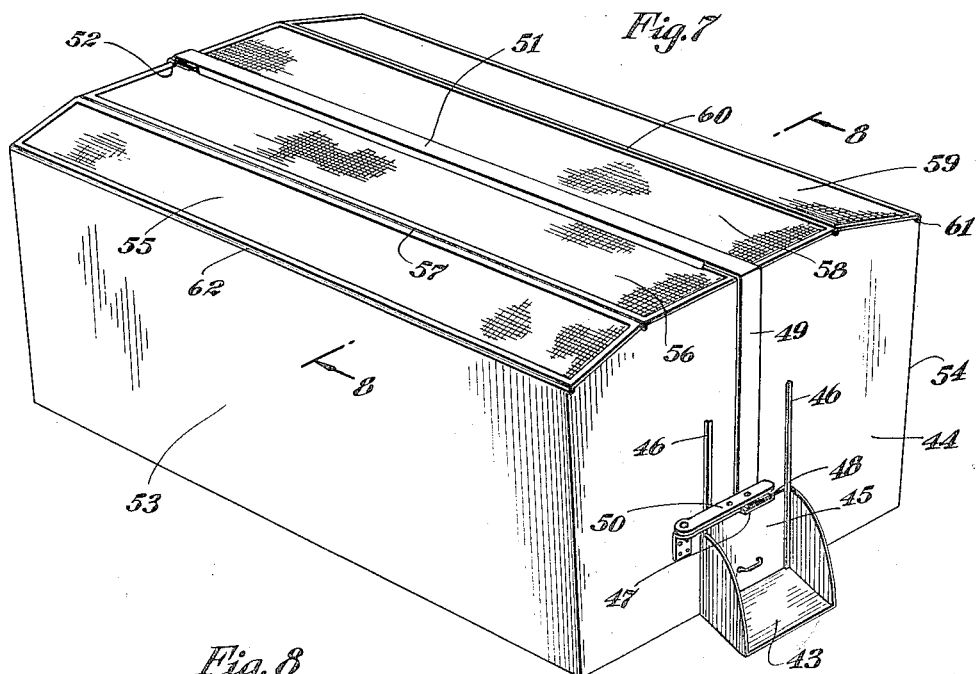
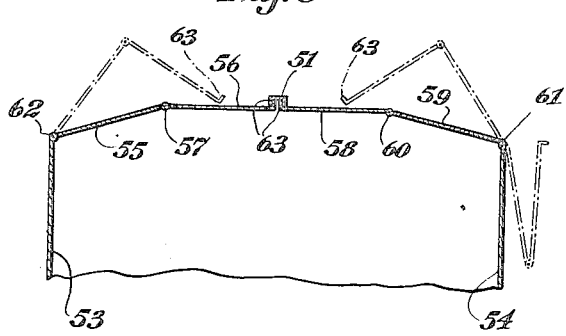

UNITED STATES PATENT OFFICE

JACOB GINSBERG, OF BROOKLYN, NEW YORK, ASSIGNOR TO MORRIS J. GINSBERG, OF BROOKLYN, NEW YORK, AND MORTON WORMSER, OF NEW YORK, N. Y.

VEHICLE

Application filed May 29, 1931. Serial No. 540,889.

My present invention relates generally to vehicles, and has particular reference to trucks for the transportation of solid material such as coal.

Although I have herein illustrated and shall hereinafter describe my invention as it relates to the transportation and delivery of coal, nevertheless it will be understood that from a number of aspects my invention relates more generally to any type of vehicle adapted to be loaded by gravity from the top and adapted to be emptied by discharging the contents by gravity through chutes provided on the vehicle for that purpose.

Coal, fed into a delivery truck at the plant of the coal dealer, is carefully weighed before the truck is permitted to leave the plant. Frequently, dishonest employees take the opportunity, in the trip between the plant and the consumer, to remove some of the measured charge from the truck, and in many cases the consumer thereby receives less than the quantity to which he is entitled. Furthermore, the trucks are customarily loaded to maximum capacity for purposes of efficiency, and frequently the jolting of the truck results in similar losses during the trip from the plant to the point of delivery.

It is a general object of my present invention to provide a vehicle construction into which a charge of material, such as coal, may be loaded by gravity and discharged through gravity chutes; and wherein any unauthorized removal of material from the truck is rendered impossible without revealing to the party to whom the charge is to be delivered that the load has been tampered with. One of the features of my invention lies in the provision of a truck body wherein every available opening through which material might be removed is sealed and guarded in a predetermined manner, the safeguards being so arranged that a seal, irremovable except by mutilation thereof, may be efficiently and conveniently associated with the truck to prevent any manipulation of the contents until a party having the proper authority sees fit to sever or remove the seal. In many cases, it may be of advantage to have the seal marked with some identifying feature whereby the authorized person may determine whether it has been tampered with in the period elapsing between loading and delivery.

Another general object of my invention is to provide a construction which prevents any loss of contents due to jolting and the like.

A particular feature of my invention lies in providing an arrangement whereby the customary mode of procedures in loading and unloading remain unaffected. For example, coal trucks of customary construction usually require an open top so that clear and unimpeded access may be had to the interior for the purpose of loading from an overhead chute or hopper. Such hoppers are usually arranged in such a manner that there is very little space between the vehicle and the hopper during the loading operation. Furthermore, very little side clearance is usually allowed, and any guard means of the character herein referred to must therefore be constructed in such a manner as to be capable of operation with a minimum of interference with the usual procedure of loading under the restrictions of space which are usually encountered.

Furthermore, compactness of a similar character must be provided for permitting the truck to be conveniently maneuvered and parked at the point of delivery, where similar limitations of space are frequently met with.

A particular feature of my invention lies in providing guard means of the type indicated comprising closure elements or the like for the open top of the vehicle, said elements or sections being arranged to be collapsible into close and compact association with the side or sides of the vehicle when in inoperative positions.

Another feature of my invention lies in providing sealing means for the discharge chute or chutes, and in the provision of an arrangement which renders it impossible to manipulate the top closure or closures without removing or breaking these seals.

I achieve the foregoing objects and such other objects as may hereinafter appear or be pointed out, in the manner illustratively exemplified in the accompanying drawings, wherein—

Figure 3 is a cross-sectional view taken substantially along the line 3—3 of Figure 2;

Figure 4 is an enlarged plan view of a detail of the guard means;

Figure 5 is an enlarged elevational view of the sealing arrangement;

Figure 6 is a view similar to Figure 3, showing a modification;

Figure 7 is a fragmentary perspective view of a modified type of construction; and Figure 8 is a cross-sectional view taken substantially along the line 8—8 of Figure 7.

Figure 1:
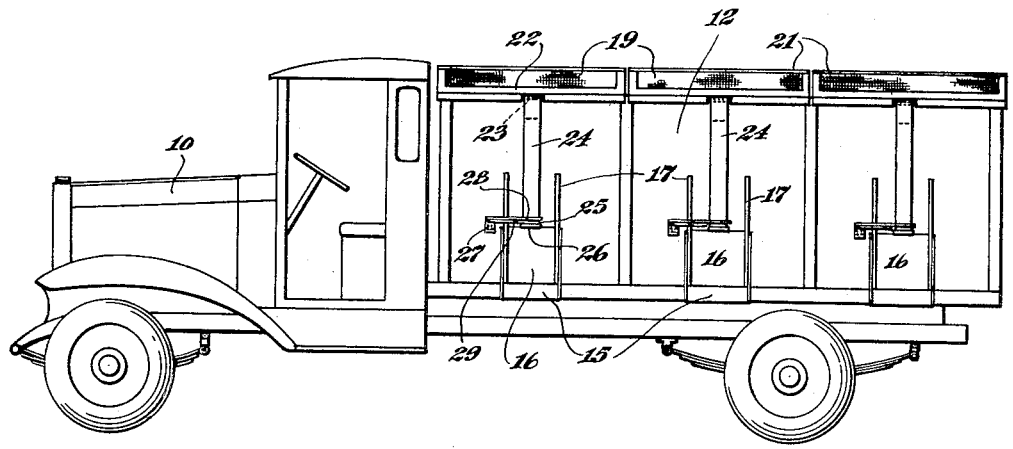
Figure 1 is a side elevational view of a truck body embodying my present invention.
Figure 2:
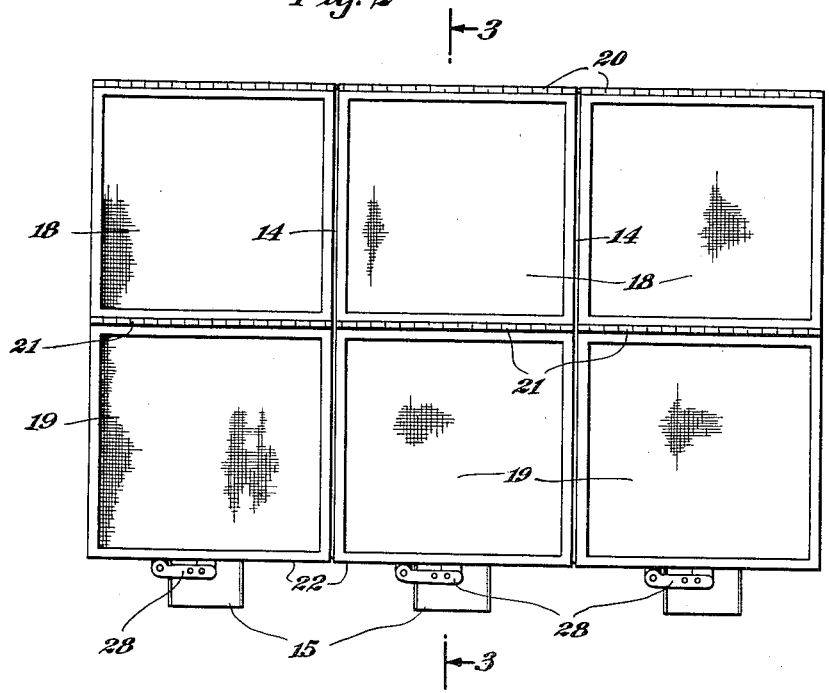
Figure 2 is a plan view of the vehicle body of Figure 1.

In Figures 1-5, I have illustratively shown a motor truck 10 having a body adapted to accommodate material, such as coal or the like, the body having a bottom 11 and upstanding opposite side walls 12 and 13. The coal is adapted to be loaded onto this truck by chuting it from hoppers located above; and the material is adapted to be delivered from the body of the truck by a gravity chute or chutes arranged near the bottom of the body. In the illustrated embodiment, the body has been divided by partitions 14 into a number of individual compartments, for the obvious purpose of permitting the delivery of individual masses of material, as, for example, in making individual deliveries to different parties.

At the bottom of each of the three compartments illustrated, I provide a delivery opening in the form of a chute, and a description of one of these compartments and its associated parts will be deemed sufficient, since they are all preferably constructed in the same general manner. Referring to Figure 3, for example, I have shown a chute 15 with a control means in the form of a gate 16, the latter consisting preferably of a plate or similar element which is vertically slidable within guides 17 secured in position on the side wall 12 of the body. By moving the gate 16 upwardly in its guides, the speed of feeding the material may be controlled; and, if desired, the compartment may be completely emptied through the chute 15.

In accordance with my present invention, the filling of any compartment is followed not only by closing and sealing the gate 16, but also by closing and covering the open top of the loaded compartment. The guard cover for the open top may be of any suitable construction which is collapsible in the manner and for the general purposes hereinbefore mentioned, but I prefer to provide a closure in the form of complementary, mutually hinged sections which are adapted to be collapsed into close parallelism alongside of one of the upstanding side walls of the truck body. In Figure 3, for example, I have shown a pair of hinged sections 18 and 19, the section 18 being hinged, as at 20, to the upper edge of the wall 13, and the section 19 being hinged, as at 21, to the adjacent edge of the section 18.

The joint 21 is so constructed that when the closure is in operative position the sections will be prevented from collapsing downwardly into the compartment. Furthermore, the joint 20 is so constructed that the sections may be swung toward the right into the dot-and-dash position illustrated in Figure 3, at which time, it will be noted, completely clear and unimpeded access may be had to the interior of the body through the open top thereof, while the sections 18 and 19 are compactly arranged alongside of the wall 13. Any suitable securing means or catch or spring retainer or the like may be provided in association with the free edge 22 of the section 19 to cooperate with the upper edge of the wall 13 when the closure is in the inoperative position.

Associated with the free edge 22, and preferably pivoted thereto as at 23, is a link 24 adapted to extend downwardly along the exterior of the side wall 12, the free end of the link being provided with a flange 25 having an opening therein. This flange is adapted to cooperate with the gate 16 which is provided at its upper edge with a similar flange 26 having a complementary opening therein.

Mounted in a bracket 27 on the side wall 12, and closely adjacent to the upper edge of the gate 16, is a locking bar 28 which is adapted to be swung from the inoperative dot-and-dash position of Figure 4 into the operative full-line position. The parts are so arranged and sized that the flanges 25 and 26 will be adapted to lie in close superposition and the free end of the bar 28 may then be positioned over these flanges to form a three-ply arrangement.

Preferably, though not necessarily, a bracket plate 29 is arranged as shown between the bracket 27 and the gate 16, and is provided with an opening adapted to register with a similar opening in the bar 28. As a result of this arrangement, I am enabled to pass the sealing device through the openings in the manner illustrated most clearly in Figure 5. Although any type of seal may be employed, I prefer to use a tie element 30 which is looped through the openings previously mentioned and has its two ends firmly and permanently secured together by a lead seal 31 or the like which preferably bears an identifying mark. It is obvious that with a seal of this character in position, the gate 16 cannot be opened, nor can the link 24 be released or moved without removing the seal. If the seal is of a character which cannot be removed without mutilation thereof, any unauthorized tampering with the contents of the truck body will be at once apparent to the ultimate consignee who, it is contemplated, will be the only authorized party to examine the seal prior to the delivery of the coal and to remove the same by severing the tie member 30.

In operation, the truck will be loaded in the usual manner, the gate 16 being obviously in closed position during this procedure. The cover sections 18 and 19 are then swung across the open top and the link 24 is sealed into association with the gate 16 and the locking bar 28 in the manner described. In unloading the vehicle, the seal is removed, and this permits the bar 28 to be swung aside and the link 24 to be swung upwardly, whereby the gate 16 may be manipulated in the customary manner to permit the material to discharge by gravity through the chute 15.

The arrangement of openings to accommodate the seal is, of course, optional, but I prefer the construction illustrated because of the simplicity thereof and because of the rigid manner in which it holds all the cooperating parts together.

I have illustratively shown the sections 18 and 19 composed of mesh or the like, this construction permitting inspection of the load at all times, but it will be understood that solid closure sections may be employed, if desired. Similarly, more than two sections may conveniently be used, as illustrated in Figure 6, the same collapsibility being attained by this arrangement except that it may be preferable in connection with wider vehicles. In Figure 6, I have shown four mutually hinged sections 32, 33, 34, and 35, one edge of the section 32 being hinged as at 36 to the side wall 37 of the truck, and the free edge of the section 35 being hinged as at 38 to a link 39 which corresponds to the link 24 previously described. The pivotal joints 40, 41, and 42 are so constructed that the sections may be collapsed into the compact relation illustrated in dot-and-dash lines in Figure 6.

In Figures 7 and 8, I have illustrated a construction wherein the truck body is not divided into compartments and in which a single delivery chute 43 is arranged on the rear wall 44 of the body. A truck of this character receives only one charge and is usually emptied by tilting the body rearwardly to permit the contents to escape through the chute 43. The chute construction is substantially the same as hereinbefore described, a gate 45 being vertically slidable in guides 46 and provided with a flange 47 at its upper edge adapted to cooperate with the flange 48 of the link 49 and with the pivotable locking bar 50. The link 49 is in this case an entirely separate member, however, being constituted by the end of the bar 51 which may, for example, be pivoted at its rear end 52 to the front wall of the truck. The cover for the open top is, in this construction, composed of two complementary sections, one of which is hinged to the upper edge of the side wall 53, and the other of which is hinged to the upper edge of the opposite side wall 54. Each closure may advantageously be composed of two sections. I have for illustrative purposes shown the sections 55 and 56 hinged at 57 and adapted to cover one longitudinal half of the truck body. A similar pair of sections 58 and 59 are hinged as at 60 and enclose the other half of the body. The sections 58 and 59 are adapted to be collapsed around the hinge axis 61 into the dot-and-dash position shown; and the sections 65 and 66 are similarly capable of collapse around the hinge axis 62 in a similar manner.

The bar 51 cooperates with the closure sections by any suitable means. This bar may, for example, be in the form of an inverted channel which engages the upstanding flanges 63 arranged along the free edges of the sections 56 and 58, respectively.

In loading this construction, the bar 51 is swung forwardly and the entire top of the truck may be made accessible in an unimpeded manner. After it is loaded, the top is covered over in the manner illustrated in Figure 8, and the bar 51 holds the closure in this operative position. The link 49 cooperates with the gate 45 in the same manner as described hereinbefore, and an opening of the top is rendered impossible without breaking or removing whatever seal may be associated with the discharge chute.

It will thus be seen that I have provided a construction of extremely simple nature which is nevertheless highly efficient in accomplishing the desired objectives. The ease of loading and unloading each truck is not materially impaired, and loss of contents either through inadvertence or through deliberate theft, is effectually prevented, with corresponding benefits not only to the consumer and the dealer or shipper, but also the employees who are thus cleared of any possible suspicion.

Obviously, many changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a coal truck, a truck body having a top for permitting a loading of the body from above, and at least one delivery chute at the bottom for permitting the loaded coal to be chuted out of the body by gravity, a pivoted locking bar carried by said body, a slidable closure for said delivery chute and cooperable with the latter to vary the effective opening through which the coal is permitted to be withdrawn, said closure carrying a locking projection adjacent its upper edge which comes into proximity with said locking bar when the closure is in a position completely sealing the chute, an openable cover for the top of the truck body, a locking strap associated with said cover and adapted to be positioned in proximity to said locking bar when the cover is in closed position over the top of the truck body, and a single sealing device adapted to engage said locking bar, locking projection, and locking strap when in superimposed relationship, thereby rendering the load in the truck body wholly inaccessible as long as said sealing device is operative.

2. In a coal truck, a truck body having an open top for permitting a loading of the body from above, and at least one delivery chute at the bottom for permitting the loaded coal to be chuted out of the body by gravity, a locking element carried by said body, a slidable closure for said delivery chute and provided with a locking element which is in proximity with said first-named locking element when the closure is in a position completely sealing the chute, an openable cover for the top of the truck body, a locking element carried by said cover and adapted to be positioned in proximity to said first-mentioned locking element when the cover is in closed position over the top of the truck body, and a single sealing device adapted to engage said three locking elements when the latter are in mutual proximity, thereby rendering the load in the truck body wholly inaccessible as long as said sealing device is operative.

3. In a coal truck, a truck body having a top for permitting a loading of the body from above, a delivery chute at the bottom of the body for permitting the loaded coal to be chuted out of the body by gravity, a locking element fixedly carried by said body adjacent to said chute, a slidable closure for said chute and cooperable with the latter to vary the effective opening through which the coal is permitted to be withdrawn, said closure carrying a locking projection which comes into proximity with said fixed locking element when the closure is in a position completely sealing the chute, a collapsible cover for the top of the truck body, a locking strap carried by said cover and adapted to have its lower end positioned in proximity to said fixed locking element when the cover is in closed position over the top of the truck body, and a single sealing device adapted to engage said fixed locking element, said locking projection, and the lower end of said locking strap when the latter are in mutual proximity, thereby rendering the load in the truck body wholly inaccessible as long as said sealing device is operative.

In witness whereof I have signed this specification this 15 day of May 1931.

JACOB GINSBERG.